(12) United States Patent
Taki et al.

(10) Patent No.: US 10,997,105 B2
(45) Date of Patent: May 4, 2021

(54) SEMICONDUCTOR DEVICE AND METHOD OF OPERATING THE SAME

(71) Applicant: RENESAS ELECTRONICS CORPORATION, Tokyo (JP)

(72) Inventors: Yoshitaka Taki, Tokyo (JP); Tadaaki Tanimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/853,139

(22) Filed: Apr. 20, 2020

(65) Prior Publication Data

US 2020/0394147 A1 Dec. 17, 2020

(30) Foreign Application Priority Data

Jun. 17, 2019 (JP) .............................. JP2019-111998

(51) Int. Cl.
*G06F 13/40* (2006.01)
*G06F 21/72* (2013.01)

(52) U.S. Cl.
CPC .......... *G06F 13/4022* (2013.01); *G06F 21/72* (2013.01)

(58) Field of Classification Search
CPC ...................................................... G07C 5/008
See application file for complete search history.

(56) References Cited

U.S. PATENT DOCUMENTS 8,458,516 B2 6/2013 Matsuyama

FOREIGN PATENT DOCUMENTS

JP 2010-198131 A 9/2010

*Primary Examiner* — Henry Tsai
*Assistant Examiner* — Juanito Borromeo
(74) *Attorney, Agent, or Firm* — McDermott Will & Emery LLP

(57) ABSTRACT

In a semiconductor device including a lockstep function, conflicts of bus accesses by a plurality of processors are suppressed. The semiconductor device includes a first processor, a second processor for monitoring operation of the first processor in a first mode, first and second buses, first and second non-shared resources dedicated to either the first or second processor in a second mode, and a first selector for selecting a bus for transferring interface signals between the second processor and the selected bus. In a second mode in which the first and second processors execute different instructions, the first selector selects the second bus. In the second mode, the first non-shared resource is accessed by the first processor via the first bus and the second non-shared resource is accessed by the second processor via the second bus.

18 Claims, 9 Drawing Sheets

SEMICONDUCTOR DEVICE AND METHOD OF OPERATING THE SAME

CROSS-REFERENCE TO RELATED APPLICATIONS

The disclosure of Japanese Patent Application No. 2019-111998 filed on Jun. 17, 2019 including the specification, drawings and abstract is incorporated herein by reference in its entirety.

BACKGROUND

The present disclosure relates to a semiconductor device, for example, a semiconductor device including a plurality of processors and, as modes of operation, a lockstep mode in which a plurality of processors perform the same operation and a non-lockstep mode in which a plurality of processors perform different operations.

In recent years, there has been a semiconductor device that includes a built-in processor for executing programs, which realizes an improvement in reliability or an improvement in throughput by incorporating a plurality of processors. Such a semiconductor device may include a lockstep mode in which a plurality of processors are operated so as to obtain the same calculation result, and a non-lockstep mode in which a plurality of processors are operated differently.

There are disclosed techniques listed below.
(Patent Document 1) Japanese Unexamined Patent Application Publication No. 2010-198131

Patent Document 1 discloses an example of a semiconductor device capable of switching between a lockstep mode and a free step mode which is a non-lockstep mode. In the lockstep mode, the plurality of processors described in Patent Document 1 detect errors by causing the plurality of processors to execute the same processing and comparing the execution results of the processing. On the other hand, in the free step mode, a plurality of processors can execute different processing. Therefore, semiconductor device described in Patent Document 1 can improve the throughput of the entire semiconductor device in the free step mode.

On the other hand, in a semiconductor device including a plurality of processors, circuits for realizing various functions may be provided as resources in addition to the plurality of processors. Here, the resource is, for example, a memory, a timer, an I/O interface circuit, an analog-to-digital converter, or a peripheral circuit such as a digital-to-analog converter. If semiconductor device comprises such resources, the processor writes to or reads from the resources via the buses.

SUMMARY

In the non-lockstep mode, a plurality of processors perform arithmetic processing in parallel and access resources via a bus as necessary. At this time, when a plurality of processors share a bus, there is a possibility that a conflict for bus access by the plurality of processors occurs. When a bus access conflict occurs, bus access by one processor is permitted, while bus access by another processor is stalled, thereby a problem of degrading the performance of the entire semiconductor device occurs.

Patent Document 1 discloses a processor system for providing an input signal from an external circuit shared with a master processor to a checker processor during a lockstep mode, and for providing an input signal from another external circuit to the checker processor during a free step mode. However, Patent Document 1 does not disclose any measures to suppress bus access conflicts that may occur when a plurality of processors access peripheral devices in the non-lockstep mode.

It is an object of the present disclosure to suppress conflicts between bus accesses by a plurality of processors in a non-lockstep mode and to improve the performance of a semiconductor device in a semiconductor device capable of switching between a lockstep mode and a non-lockstep mode. Other objects and novel features will become apparent from the description of the present specification and the drawings.

Means of Solving the Problems

Semiconductor device comprises a first processor, a second processor for monitoring operation of the first processor in a first mode, first and second buses, first and second non-shared resources dedicated to either the first or second processor in a second mode, and a first selector for selecting a bus for transferring interfacing signals between the second processor and the first processor. In a first mode in which the first and second processors execute the same instruction stream, the first selector selects the first bus. In a second mode in which the first processor and the second processor execute different instruction streams, the first selector selects the second bus. In the second mode, the first processor accesses the first non-shared resource via the first bus and the second processor accesses the second non-shared resource via the second bus.

A method of operating a semiconductor device according to another embodiment that includes a first and a second processor, first and second non-shared resources, a first and a second bus, and a first to a third selector, the first processor coupled to the first bus, includes setting either the first or the second mode of operation, executing the same instruction stream by the first and second processors in the first mode of operation, executing different instruction streams by the first and second processors in the second mode of operation. Executing the different instruction streams includes accessing a first non-shared resource by a first processor via a first bus and a second selector, and accessing a second non-shared resource by a second processor via a first selector, a second bus, and a third selector.

A semiconductor device according to another embodiment includes a first processor, a second processor for monitoring operation of the first processor in a first mode, first and second buses, a shared resource coupled to the first and second buses and commonly utilized by the first and second processors, a non-shared resource dedicated by the second processor in a second mode, and a first selector for selecting a bus for transferring interface signals between the second processor and the non-shared resource. In a first mode in which the first and second processors execute the same instruction stream, the first selector selects the first bus, and the first selector transfers an interface signal between the first bus and the second processor. In a second mode in which the first processor and the second processor execute different instruction streams, the first selector selects the second bus, and the second processor accesses the non-shared resource via the second bus.

According to one embodiment, a semiconductor device can suppress conflicts of bus accesses by a plurality of processors and improve the performance of semiconductor device in the non-lockstep mode.

DETAILED DESCRIPTION

Figure 1:
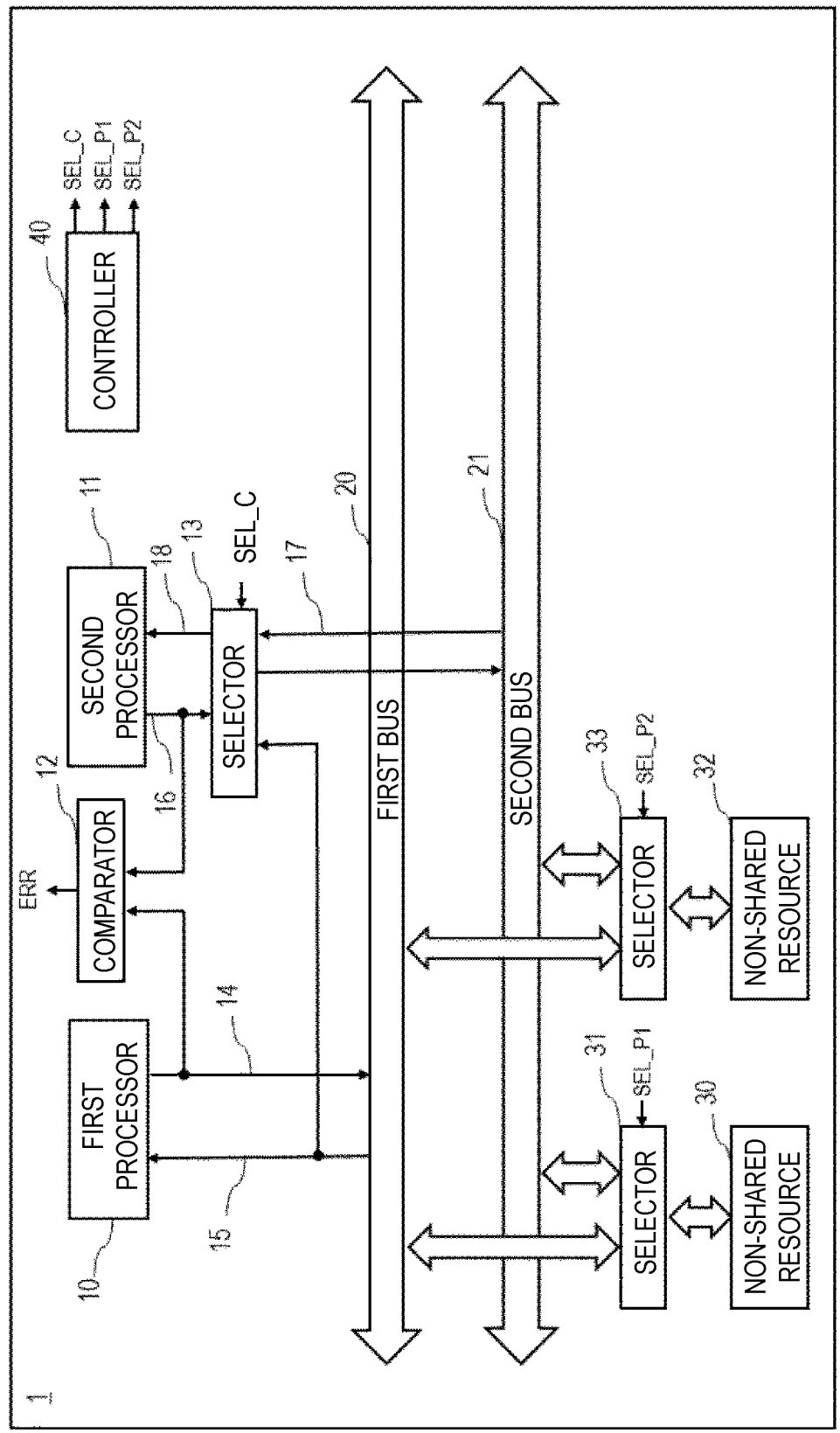
FIG. 1 is a block diagram illustrating an exemplary configuration of a semiconductor device according to a first embodiment.

For clarity of explanation, the following description and drawings are appropriately omitted and simplified. In the drawings, the same elements are denoted by the same reference numerals, and a repetitive description thereof is omitted as necessary.

First Embodiment

FIG. 1 is a block diagram illustrating an example of the configuration of the semiconductor device 1 according to the first embodiment. As shown in FIG. 1, semiconductor device 1 includes a first processor 10, a second processor 11, a comparator 12, a selector (first selector) 13, a first bus 20, a second bus 21, a non-shared resource (first non-shared resource) 30, a non-shared resource (second non-shared resource) 32, a selector (second selector) 31, a selector (third selector) 33, and a controller 40.

The first processor 10 and the second processor 11 are processing circuits that execute a program (instruction stream) read from a memory (not shown) and perform processing. For example, the processors may be CPU (Central Processing Unit), DSP (Digital Signal Processor), or the like. As the operation modes of the plurality of built-in processors, the semiconductor device according to the first embodiment has a lockstep mode, i.e., first mode, first operation mode, in which the plurality of processors are operated so as to obtain the same calculation result from the respective processors, and a non-lockstep mode, i.e., second mode, second operation mode, in which the plurality of processors are operated independently.

In lockstep mode, one processor is used for the main operation and the other processor is used as a checking processor to monitor the operation of one processor. In the lockstep mode, the failure of the operation core can be detected early based on the difference between the operation results of the two processors, so that the reliability of the operation result can be improved. On the other hand, in the non-lockstep mode, since a plurality of processors respectively execute programs, high-speed arithmetic processing can be performed by increasing the number of programs to be executed in parallel.

In order to the first processor 10 and the second processor 11 in the locking step mode so as to output the same operation result, the first processor 10 and the second processor 11 have a preference to be the same circuit configuration, but may be different configurations.

The first processor 10 is coupled to a first bus 20. The second processor can be coupled to the first bus 20 or the second bus 21 via a selector 13 described later.

Although FIG. 1 shows an exemplary configuration including two processors, i.e., a first processor 10 and a second processor 11, the configuration of semiconductor device 1 is not limited thereto. The number of processors included in semiconductor device 1 may be any number as long as the number of processors is 2 or more. For example, semiconductor device 1 may include four processors.

The non-shared resources 30 and 32 are circuits including peripheral functions such as a memory, a timer, an I/O interface circuit, an analog-to-digital conversion circuit, or a digital-to-analog conversion circuit. In the non-lockstep mode, each of the non-shared resources 30 and 32 is dedicated by either the first processor 10 or the second processor 11. On the other hand, in lockstep mode, the first processor 10 may utilize both non-shared resources 30 and 32. In other words, the first processor 10 can access both the non-shared resources 30 and 32, and can utilize the arithmetic processing performed by the non-shared resources 30 and 32. Although FIG. 1 shows an exemplary configuration including two non-shared resources 30 and 32 as non-shared resources, the configuration of the semiconductor device 1 is not limited thereto. The semiconductor device 1 may comprise any number of two or more non-shared resources.

The first bus 20 is configured to enable transfer of data between the first processor 10, the second processor 11, the non-shared resource 30, and the non-shared resource 32. The second bus 21 is configured to enable transfer of data between the second processor 11, the non-shared resource 30, and the non-shared resource 32. As will be described later, the second processor 11 can transmit and receive data to and from the first bus 20 or the second bus 21 via the selector 13. More specifically, the selector 13 can transmit a group of interface signal, i.e., the first group of interface signal 15, transmitted from the first bus, or can transmit another group of interface signal, i.e., the second group of interface signal 17, transmitted from the second bus to the second processor 11. The selector 13 can transmit another group of interface signal, i.e., the third group of interface signal 16, output by the second processor 11 to the second bus 21. Furthermore, the non-shared resource 30 can transmit and receive data to and from the first bus 20 or the second bus 21 via the selector 31. Similarly, the non-shared resource 32 can transmit and receive data to and from the first bus 20 or the second bus 21 via the selector 33.

In the lockstep mode, the comparator 12 compares the operation result of the first processor 10 with the operation result of the second processor 11 which monitors the operation of the first processor. When the operation result of the first processor 10 and the operation result of the second processor 11 are different from each other, the comparator 12 activates the error signal ERR.

More specifically, the comparator 12 compares a group of interface signal, i.e., the fourth group of interface signal 14 output by the first processor 10 to a non-shared resource 30 or non-shared resource 32 with another group of interface signal 16 output by the second processor 11 to a non-shared resource 30 or non-shared resource 32. When the group of interface signal 14 and the group of interface signal 16 are different from each other, the comparator 12 activates the error signal ERR.

The signals monitored by the comparator 12 need not be all of the signals included in the group of interface signal 14 and the group of interface signal 16, and may be a part of the signals included in the group of interface signal 14 and the group of interface signal 16. For example, the comparator 12 may compare only the data signal, or may compare both of the address signal and the data signal. The error signal ERR may be activated in the lockstep mode or the non-lockstep mode, and may be referred to by an error processing circuit, not shown here, only in the lockstep mode.

The error signal ERR outputted from the comparator 12 can be used for various processing for ensuring the reliability of the semiconductor device 1. For example, when the error signal ERR is activated, the semiconductor device 1 initializes the entire semiconductor device 1. When detecting the error signal ERR, the semiconductor device 1 may re-execute the program in which the error signal ERR is activated.

The selector 13 selects whether to transmit the group of interface signal 15 transmitted from the first bus 20 to the second processor 11 or to transmit the group of interface signal 17 transmitted from the second bus 21 to the second processor 11 in response to the non-lockstep mode valid signal SEL_C. In the lockstep mode, the selector 13 prevents the group of interface signal 16 output by the second processor 11 from being transmitted to the first bus 20 and the second bus 21. On the other hand, in the non-lockstep mode, the selector 13 transmits the group of interface signal 16 output by the second processor 11 to the second bus 21.

More specifically, the selector 13 prevents the group of interface signal 16 output by the second processor from being output to the first bus 20 and the second bus 21 in a state in which the non-lockstep mode valid signal SEL_C indicates the lockstep mode. Further, in the locking step mode, the selector 13 selects the group of interface signal 15 transmitted from the first bus 20 and transmits it to the second processor 11 as the group of interface signal, i.e., the fifth group of interface signal 18.

In a state in which the non-lockstep mode valid signal SEL_C indicates the non-lockstep mode, the selector 13 outputs the group of interface signal 16 output by the second processor 11 to the second bus 21. In the non-lockstep mode, the selector 13 selects the group of interface signal 17 among the group of interface signal 15 transmitted from the first bus 20 and the group of interface signal 17 transmitted from the second bus 21, and transmits the group of interface signal 17 as the group of interface signal 18 to the second processor 11. That is, the second processor 11 accesses the non-shared resource 30 or the non-shared resource 32 via the second bus 21.

The selector 31 selects a bus through which the first processor 10 or the second processor 11 accesses the first non-shared resource 30 from either the first bus 20 or the second bus 21. The bus selection signal SEL_P1 is a value at which the selector 31 selects the first bus 20 in the lockstep mode. That is, in the lockstep mode, the first processor 10 accesses the non-shared resource 30 via the first bus 20 selected by the selector 31. On the other hand, in the non-lockstep mode, the selector 31 can select either the first bus 20 or the second bus 21 based on the value of the bus selection signal SEL_P1. In the non-lockstep mode, the first processor 10 or the second processor 11 accesses the first non-shared resource 30 via the bus selected by the selector 31.

In addition to the normal bus access processing described above, the selector 31 can also detect an illegal bus access in the non-lockstep mode. The selector 31 is coupled to the first bus 20 and the second bus 21, and also receives the bus selection signal SEL_P1. Therefore, the selector 31 can detect that a transmission and reception access request for the non-shared resource 30 has occurred on a bus that is not selected by the bus selection signal SEL_P1. Therefore, the selector 31 can determine whether or not the bus access is normal.

The selector 33 selects the bus through which the first processor 10 or the second processor 11 accesses the second non-shared resource 32 from either the first bus 20 or the second bus 21. The bus selection signal SEL_P2 is a value at which the selector 33 selects the first bus 20 in the lockstep mode. That is, in the lockstep mode, the first processor 10 accesses the non-shared resource 32 via the first bus 20 selected by the selector 33. On the other hand, in the non-lockstep mode, the selector 33 can select either the first bus 20 or the second bus 21 based on the value of the bus selection signal SEL_P2. In the non-lockstep mode, the first processor 10 or the second processor 11 accesses the second non-shared resource 32 via the bus selected by the selector 33.

In addition to the normal bus access processing described above, the selector 33 can also detect an illegal bus access in the non-lockstep mode. The selector 33 is coupled to the first bus 20 and the second bus 21, and also receives a bus selection signal SEL_P2. Therefore, the selector 33 can detect that a transmission and reception access request for the non-shared resource 32 has occurred on a bus that is not selected by the bus selection signal SEL_P2. Therefore, the selector 33 can determine whether or not the bus access is normal.

As described above, the selectors 31 and 33 can determine whether the bus access is normal or not, but the configuration for determining whether the bus access is normal or not is not limited to this. For example, the first processor 10 and the second processor 11 may each include an MPU, i.e., Memory Protection Unit, which is not shown here, and the MPU may determine whether the bus access is normal or not. Alternatively, it may be determined whether the bus access is normal or not by a bus control circuit, which is not shown here, provided separately from the selectors 31 and 33.

The controller 40 is a control circuit that generates a non-lockstep mode valid signal SEL_C, a bus selection signal SEL_P1, and a bus selection signal SEL_P2. The non-lockstep mode valid signal SEL_C generated by the controller 40 is input to the selector 13. The bus selection signals SEL_P1 and SEL_P2 generated by the controller 40 are input to the selector 31 and the selector 33, respectively. In FIG. 1, those couplings are omitted in order to avoid complication of the drawing.

Figure 2:
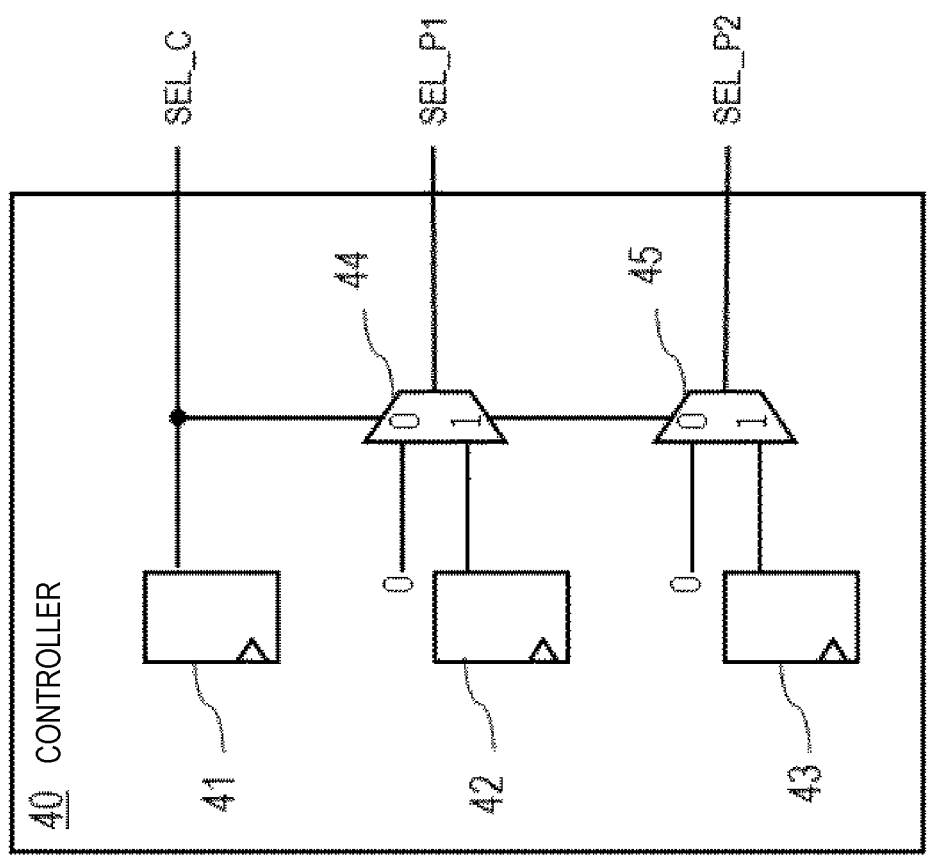
FIG. 2 is a circuit diagram illustrating an exemplary configuration of a controller of the semiconductor device according to the first embodiment.

FIG. 2 is a schematic diagram illustrating an exemplary configuration of the controller 40 according to the first embodiment. As shown in FIG. 2, the controller 40 includes flip-flops 41, 42, and 43, and multiplexers 44 and 45. The values of the non-lockstep mode valid signal SEL_C, the bus selection signal SEL_P1, and the bus selection signal SEL_P2 are determined by setting desired values in the setting registers 41, 42, and 43 configured of flip-flops. For example, prior to the semiconductor device 1 initiating the main processing, the first processor 10 may execute initialization programs to set the values of configuration registers 41, 42 and 43. In FIG. 2, the values of the non-lockstep mode valid signal SEL_C, the bus selection signal SEL_P1, and the bus selection signal SEL_P2 are determined by the values of the setting registers 41, 42, and 43, but the method of determining the values of the non-lockstep mode valid signal SEL_C, the bus selection signal SEL_P1, and the bus selection signal SEL_P2 is not limited to the configuration example of FIG. 2. For example, the values of the non-lockstep mode valid signal SEL_C, the bus selection signal SEL_P1, and the bus selection signal SEL_P2 can be set by reading the values stored in a nonvolatile memory such as a flash memory. The values of the non-lockstep mode valid signal SEL_C, the bus selection signal SEL_P1, and the bus selection signal SEL_P2 may be set by reading the values of an external terminal, which is not shown here, provided in the semiconductor device 1.

Referring to FIG. 2, for example, the non-lockstep mode valid signal SEL_C indicates the lockstep mode when it is 0, and indicates the non-lockstep mode when it is 1. The bus selection signals SEL_P1 and SEL_P2 indicate that the first bus 20 is selected when they are 0, and indicate that the second bus 21 is selected when they are 1. When the non-lockstep mode valid signal SEL_C is 0, the bus selection signals SEL_P1 and SEL_P2 are always 0, and both the selector 31 and the selector 33 select the first bus 20. On the other hand, when the non-lockstep mode valid signal SEL_C is 1, the bus selection signals SEL_P1 and SEL_P2 are determined in accordance with the setting values of the setting registers 42 and 43, respectively. Therefore, when SEL_C is 1, the selector 31 and the selector 33 respectively make it variable which of the first bus 20 and the second bus 21 is selected.

Figure 3:
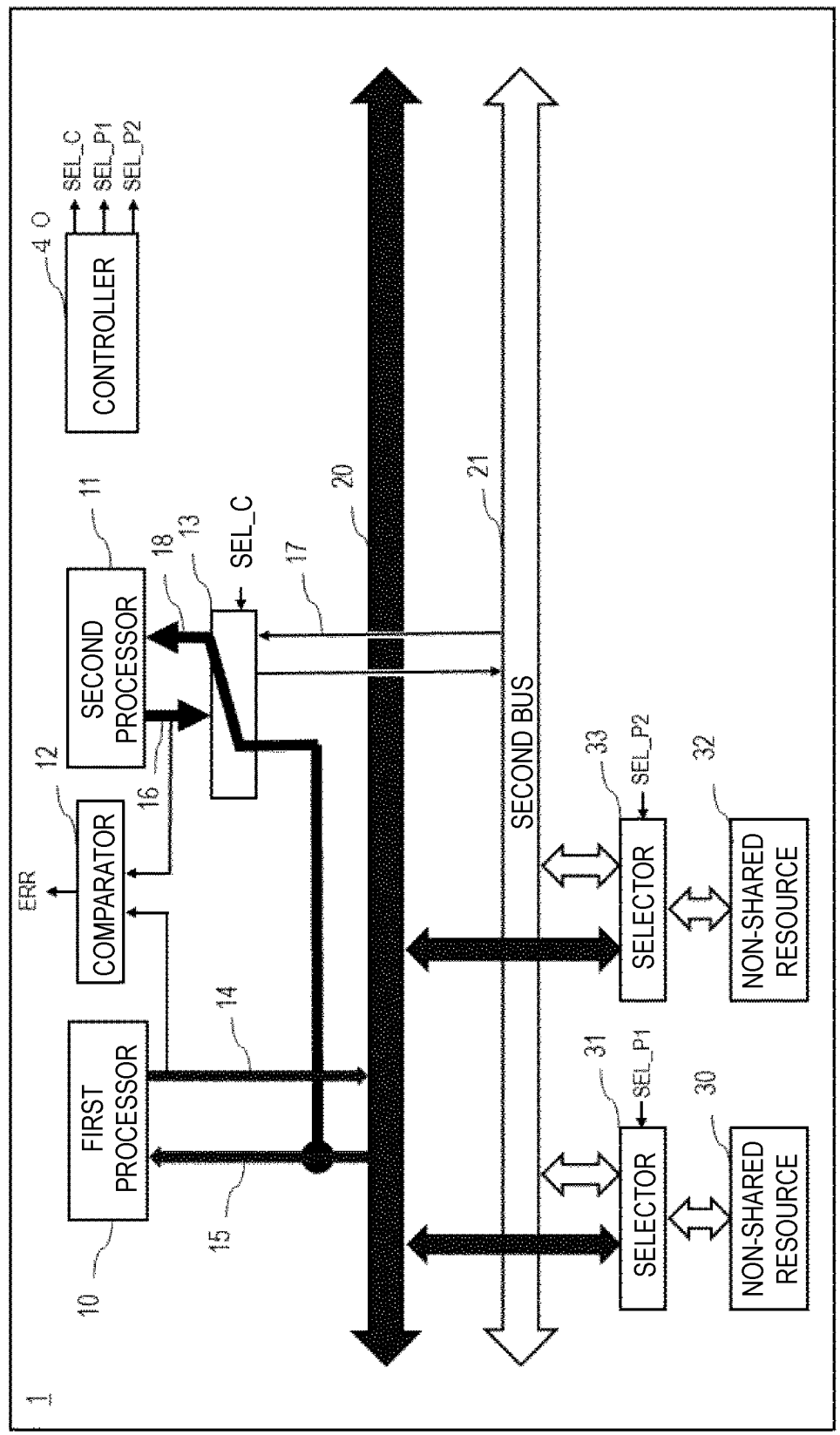
FIG. 3 is a diagram illustrating an exemplary bus access path when the semiconductor device according to the first embodiment operates in the lockstep mode.

FIG. 3 is a diagram illustrating an exemplary bus access path when the semiconductor device 1 operates in the lockstep mode. As indicated by a thick arrow in FIG. 3, in the lockstep mode, the selector 13 selects the first bus 20 and transmits the group of interface signal 15 included in the first bus 20 to the second processor 11 as the group of interface signal 18. In addition, the selector 13 suppresses the transmission so that the group of interface signal 16 output by the second processor 11 is not transmitted to the first bus 20 and the second bus. Since the selector 31 selects the first bus 20, the first processor 10 accesses the non-shared resource 30 via the first bus. Similarly, since the selector 33 selects the first bus 20, the first processor 10 accesses the non-shared resource 32 via the first bus.

The first processor 10 transmits the interface signals 14 to the non-shared resources 30 and the non-shared resources 32 via the first bus 20. The first processor 10 also receives the interface signals 15 from the non-shared resources 30 and the non-shared resources 32 via the first bus 20. The second processor 11 receives the interface signals 15 as the interface signals 18 from the non-shared resources 30 and the non-shared resources 32 via the first bus 20. The bus group of interface signal 15 and the bus group of interface signal 18 have the same value. Therefore, when both the first processor 10 and the second processor 11 normally operate, the group of interface signal 14 reflecting the calculation result of the first processor 10 matches with the group of interface signal 16 reflecting the calculation result of the second processor 11. Therefore, the comparator 12 does not activate the error signal ERR. On the other hand, if either the first processor 10 or the second processor 11 contains a failure, the comparator 12 activates the error signal ERR.

Figure 4:
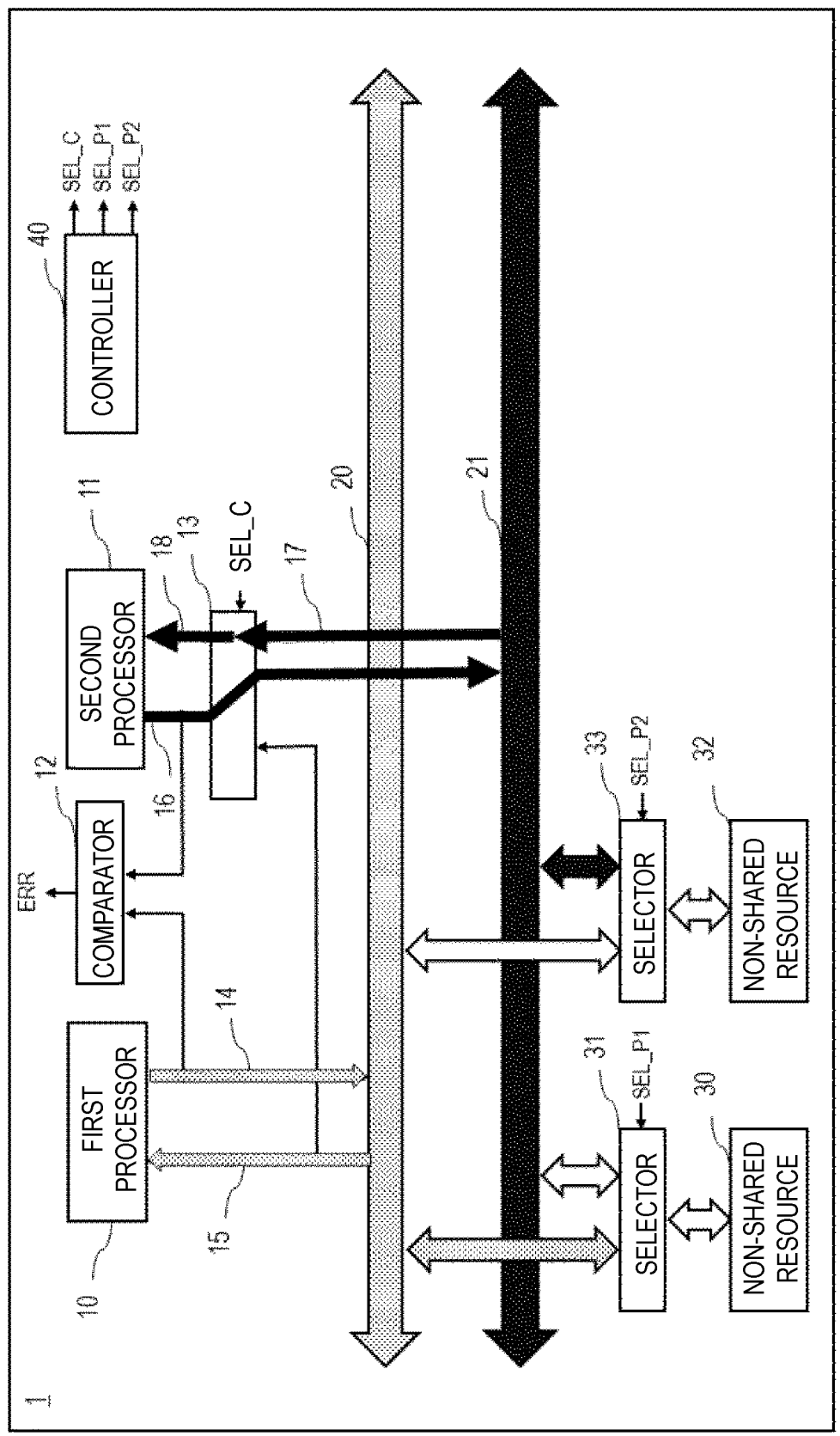
FIG. 4 is a diagram illustrating an exemplary bus access path when the semiconductor device according to the first embodiment operates in the non-lockstep mode.

FIG. 4 is a diagram illustrating an exemplary bus access path when the semiconductor device 1 operates in the non-lockstep mode. More specifically, FIG. 4 shows the bus access path of the semiconductor device 1 when the setting registers 42 and 43 are set to 0 and 1, i.e., SEL_P1=0 and SEL_P2=1, respectively. In FIG. 4, different from FIG. 3, the thick arrows are shown with separated into two types. More specifically, the bus access path formed by the first processor 10, the first bus 20, and the non-shared resource 30, the bus access path formed by the second processor 11, the second bus 21, and the non-shared resource 32 are separated from each other, and the respective bus accesses do not conflict with each other.

In the non-lockstep mode (SEL_C=1), the selector 13 selects the second bus, transmits the group of interface signal 17 to the second processor 11, and transmits the group of interface signal 16 to the second bus 21. Since the selector 31 selects the first bus 20 by setting SEL_P1=0, the non-shared resource 30 is accessed from the first processor 10 via the first bus 20. Since the selector 33 selects the second bus 21 by setting SEL_P2=1, the non-shared resource 32 is accessed from the second processor 11 via the second bus.

The first processor 10 transmits the interface signals 14 to the non-shared resource 30 via the first bus 20. The first processor 10 also receives the interface signals 15 from the non-shared resource 30 via the first bus 20. On the other hand, the second processor 11 transmits the group of interface signal 16 to the non-shared resource 32 via the second bus 21. The second processor 11 receives the group of interface signal 17 as the group of interface signal 18 from the non-shared resource 32 via the second bus 21.

Figure 5:
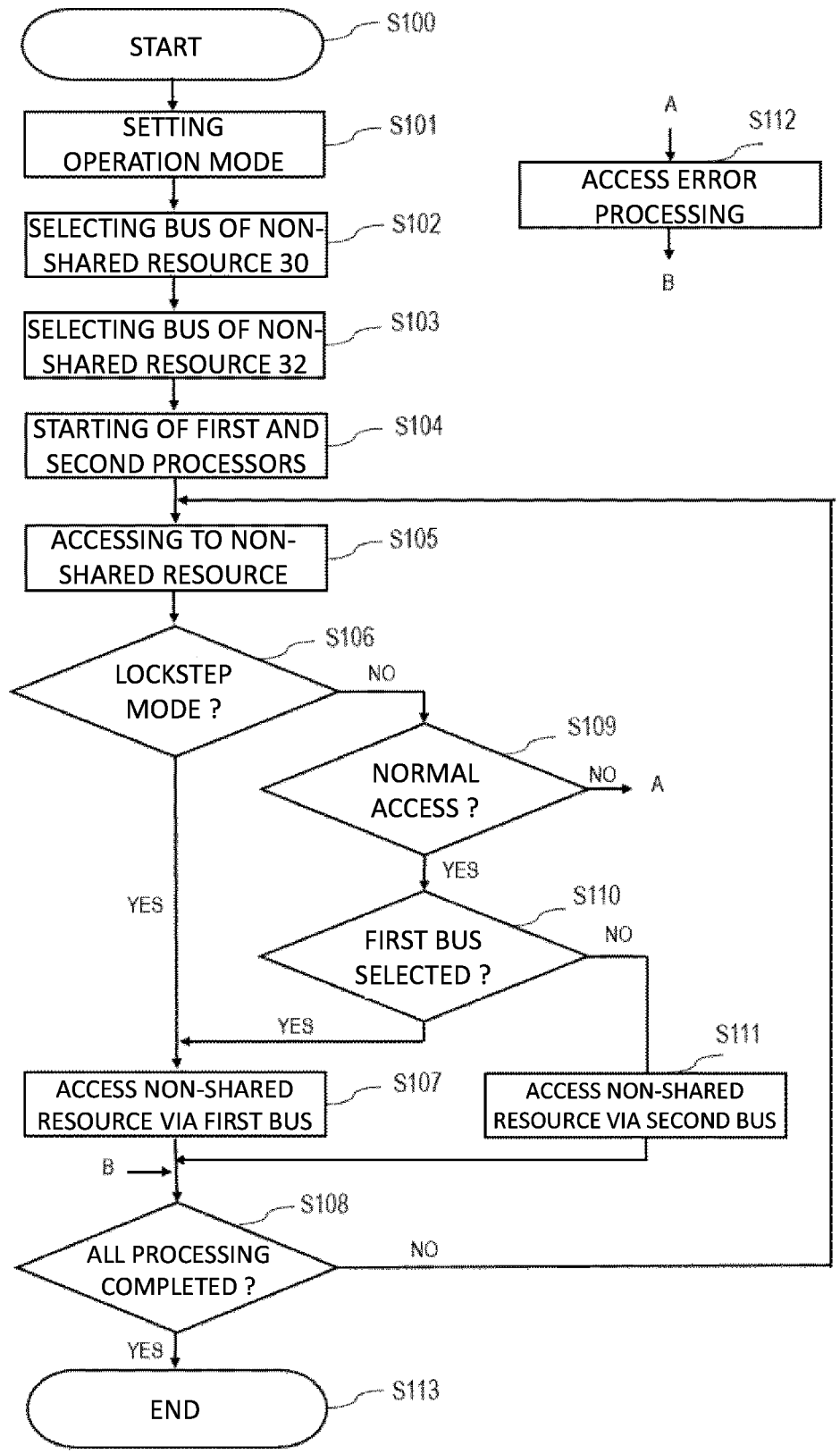
FIG. 5 is a flow chart illustrating an exemplary bus accessing operation of the semiconductor device according to the first embodiment.

FIG. 5 is a flow chart illustrating an exemplary operation of the semiconductor device 1. The operation of the semiconductor device 1 will be described with reference to FIG. 5. The method of operating the semiconductor device 1 includes a step S101 of setting the operation mode prior to starting a desired processing in the first processor 10 and the second processor 11. Here, the operation mode is either a lockstep mode or a non-lockstep mode. For example, SEL_C is initialized to 0 with a power-on reset of the semiconductor device 1. That is, the operation mode is initialized to the lockstep mode by the power-on reset of the semiconductor device 1, but the method of setting the operation mode is not limited to this method. For example, SEL_C may be determined by referring to the values of the external terminals of the semiconductor device 1 at the time of power-on reset of the semiconductor device 1. After the power-on reset of semiconductor device 1 is released, the first processor may execute initialization programs to rewrite the value of the setting register 41 and set the value of SEL_C.

The semiconductor device 1 then selects the buses through which the first processor 10 or the second processor 11 accesses the non-shared resources 30 in step S102. More specifically, for example, the first processor 10 executes a program to write a setting value in the setting register 42. As a result, the bus selected by the selector 31 in the non-lockstep mode is set. Similarly, the semiconductor device 1 selects buses through which the first processor 10 or the second processor 11 accesses the non-shared resources 32 in step S103. More specifically, for example, the first processor 10 executes a program to write a setting value in the setting register 43. As a result, the bus selected by the selector 33 in the non-lockstep mode is set.

In step S104, the semiconductor device 1 causes the first processor 10 and the second processor 11 to start a desired processing.

Each of the first processor 10 and the second processor 11 repeats the processing from step S105 to step S112 until the processing of the desired program is completed. That is, the first processor 10 and the second processor 11 access non-shared resources 30 and 32, respectively, in accordance with the instructions of the programs each executes in step S105. In the lockstep mode, i.e., YES in step S106, accesses are made from the first processor 10 to the non-shared resources 30 and the non-shared resources 32 via the first buses 20 in step S107. In the lockstep mode, i.e., YES in step S106, since the selector 13 selects the first bus, the second processor 11 receives the group of interface signals 15. However, in the lockstep mode, i.e., YES in step S106, accesses from the second processor 11 to the non-shared resources 30 or 32 via the second bus 21 do not occur.

On the other hand, in the non-lockstep mode, i.e., NO in step S106, the first processor 10 accesses the non-shared resources 30 or 32 according to the values of SEL_P1 and SEL_P2, respectively. In the non-lockstep mode, i.e., NO in step S106, since the selector 13 selects the second bus 21, the second processor 11 accesses the non-shared resources 30 or 32 through the second bus 21 according to the values of SEL_P1 and SEL_P2, respectively. Hereinafter, the operation of the semiconductor device 1 when the setting registers 42 and 43 are set to 0 and 1, i.e., SEL_P1=0 and SEL_P2=1, respectively, will be described. In this case, the first processor 10 dedicates the non-shared resource 30 and the second processor 11 dedicates the non-shared resource 32.

When the first processor 10 or the second processor 11 accesses the non-shared resources 30 or 32, the selector 31 or 33 determines whether the bus access is normal or not in step S109. For example, if the first processor 10 attempts to access the non-shared resources 30 dedicated by the first processor 10, the selector 31 determines that the access is normal, i.e., YES in step S109. On the other hand, when the first processor 10 attempts to access the non-shared resources 32 dedicated by the second processor 11, the selector 33 determines that the access is illegal, i.e., NO in step S109. When it is determined that the bus access is illegal, the semiconductor device 1 performs an access error processing in step S112. For example, the semiconductor device 1 may cause the first processor 10 to execute exceptional processing as access error processing in step S112.

When it is determined that the bus accesses to the non-shared resources 30 or 32 are normal, i.e., YES in step S109, it is determined whether the bus selected by the selector 31 or 33 is the first bus 20 or not in step S110. If the selected bus is the first bus 20, i.e., YES in step S110, the non-shared resources 30 or 32 are accessed via the first bus 20 in step S107. On the other hand, when the selected bus is not the first bus 20, i.e., NO in step S110, the non-shared resources 30 or 32 are accessed via the second bus 21 in step S111. In the example described above, SEL_P1 is 0. For this reason, the first bus 20 is selected for the non-shared resource 30, i.e., YES in step S110. Thus, accesses from the first processor 10 to the non-shared resources 30 are made via the first bus in step S107. On the other hand, in the above example, SEL_P2 is 1. Therefore, the second bus 21 is selected for the non-shared resource 32, i.e., NO in step S110. Thus, accesses from the second processor 11 to the non-shared resources 32 are made via the second bus in step S111.

When the first processor 10 or the second processor 11 has not finished executing the respective programs after the access to the non-shared resources 30 and 32 in step S107, S111 or the access error processing in step S112, i.e., NO in step S108, the processing starting from step S105 is repeated. On the other hand, when the first processor 10 and the second processor 11 have finished executing the respective programs, i.e., YES in step S108, the processing by the semiconductor device 1 ends in step S113.

According to the first embodiment, the semiconductor device 1 includes a first bus 20, a second bus 21, non-shared resources 30 and 32, and selectors 13, 31, and 33. Therefore, in the non-lockstep mode, when the first processor 10 dedicates the non-shared resource 30, the bus access to the non-shared resource 30 can be set to pass through the first bus 20 by the selection of the selector 31. When the second processor 11 dedicates the non-shared resource 32 in the non-lockstep mode, the bus access to the non-shared resource 32 can be set to pass through the second bus 21 by the selection of the selector 33. As a result, when the first processor 10 and the second processor 11 access the dedicated non-shared resources 30 and 32, respectively, it is possible to suppress the occurrence of bus access conflict. In this manner, the access path to the respective non-shared resources dedicated to the respective processors is completely separated in the non-lockstep mode, so that the performance of semiconductor device 1 is not deteriorated due to the access conflict. In addition, since it is possible to suppress conflicts in bus accesses, the present invention is suitable for applications such as security that requires security of Quality of Service, i.e., QoS.

Second Embodiment

Figure 6:
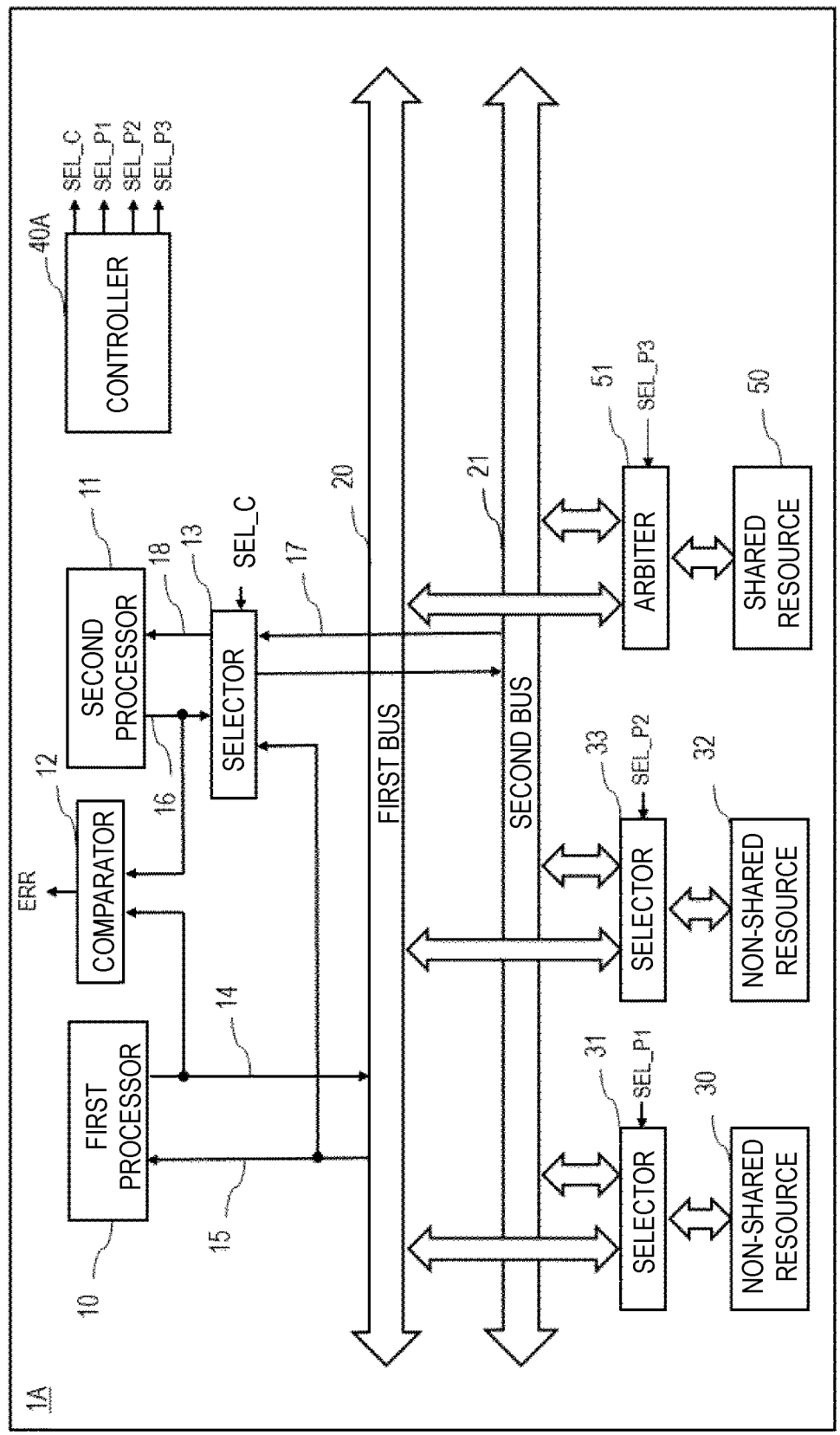
FIG. 6 is a block diagram illustrating an exemplary configuration of a semiconductor device according to a second embodiment.

Next, the second embodiment is described. FIG. 6 is a block diagram illustrating an exemplary configuration of a semiconductor device according to the second embodiment. The semiconductor device 1A according to the second embodiment differs from the semiconductor device 1 according to the first embodiment in that it further comprises a shared resource 50 and arbiter 51. Other configurations and operations are the same as those of semiconductor device 1 described in the first embodiment, and therefore, the same reference numerals are assigned to the same configurations, and duplicate descriptions are omitted.

The shared resource 50 is a resource that can be accessed by any of the first processor 10 and the second processor 11 in the non-lockstep mode. In other words, the first processor 10 and the second processor 11 commonly utilize shared resources. The shared resource 50 is a circuit including peripheral functions such as a memory, a timer, an I/O interface circuit, an analog-to-digital conversion circuit, or a digital-to-analog conversion circuit. The shared resource 50 is coupled to the first bus 20 and the second bus 21 via an arbiter 51. Although FIG. 6 shows an exemplary configuration including one shared resource 50 as a shared resource and two non-shared resources 30 and 32 as non-shared resources, the configuration of the semiconductor device 1A is not limited to this. The semiconductor device 1A may comprise two or more shared resources coupled to the first bus 20 and the second bus 21. Semiconductor device 1A may include one non-shared resource and any number of shared resources.

The arbiter 51 arbitrates the processing order of access requests to the shared resource 50 received via the first bus 20 or the second bus 21. That is, in the non-lockstep mode, when the first access request in which the first processor 10 accesses the shared resource 50 via the first bus 20 conflicts with the second access request in which the second processor 11 accesses the shared resource 50 via the second bus 21, the arbiter 51 determines which access request is to be processed with priority. The arbitration scheme of the arbiter 51 may take various schemes such as a fixed priority scheme and round robin. In the case of adopting a system in which access from a specific bus is prioritized as in the fixed priority system, it is preferable to implement a priority selection signal SEL_P3 for setting which bus access is prioritized. The priority selection signal SEL_P3 may be variable according to register setting.

The operation of the semiconductor device 1A according to the second embodiment will be described. When semiconductor device 1A operates in the lockstep mode, the first processor 10 accesses the non-shared resources 30, the non-shared resources 32, and the shared resources 50 via the first bus 20. When semiconductor device 1A operates in the lockstep mode, the second processor 11 does not access any of the non-shared resource 30, the non-shared resource 32, or the shared resource 50 via the second bus 21, but only receives the group of interface signals 15 via the first bus.

Next, the operation of semiconductor device 1A at the setting of SEL_P1=0 and SEL_P2=1 when the semiconductor device 1A operates in the non-lockstep mode, will be described. In this case, the first processor 10 accesses the non-shared resource 30 and the shared resource 50 via the first bus 20. The second processor 11 accesses the non-shared resource 32 and the shared resource 50 via the second bus 21.

According to the second embodiment, the semiconductor device 1A includes shared resources 50 and an arbiter 51. Thus, when operating in the non-lockstep mode, the first processor 10 and the second processor 11 can access the shared resource 50 via the first bus 20 and the second bus 21, respectively. For access to the shared resource 50, access from the first processor 10 and access from the second processor 11 may conflict. However, conflicting accesses are arbitrated by arbiter 51.

Like the first embodiment, the buses used by the non-shared resources 30 and 32 can be specified by the selectors 31 and 33. Thus, for example, the first processor 10 can access the non-shared resource 30 via the first bus 20. In addition, the second processor 11 can access the non-shared resource 32 via the second bus 21. Since the bus access to the non-shared resource 30 and the bus access to the non-shared resource 32 are separated from each other, the access from the first processor 10 to the non-shared resource 30 and the access from the second processor 11 to the non-shared resource 32 do not conflict with each other.

In the non-lockstep mode, the semiconductor device 1A according to present embodiment can support resources shared among a plurality of processors. Therefore, for example, when the shared resource 50 is SRAM, i.e., Static Random Access Memory, the plurality of processors can exchange data with each other via the shared resource 50. For example, when the shared resource 50 is a timer, processing can be performed based on the same information held by the timer.

Modified Example of Second Embodiment

Figure 7:
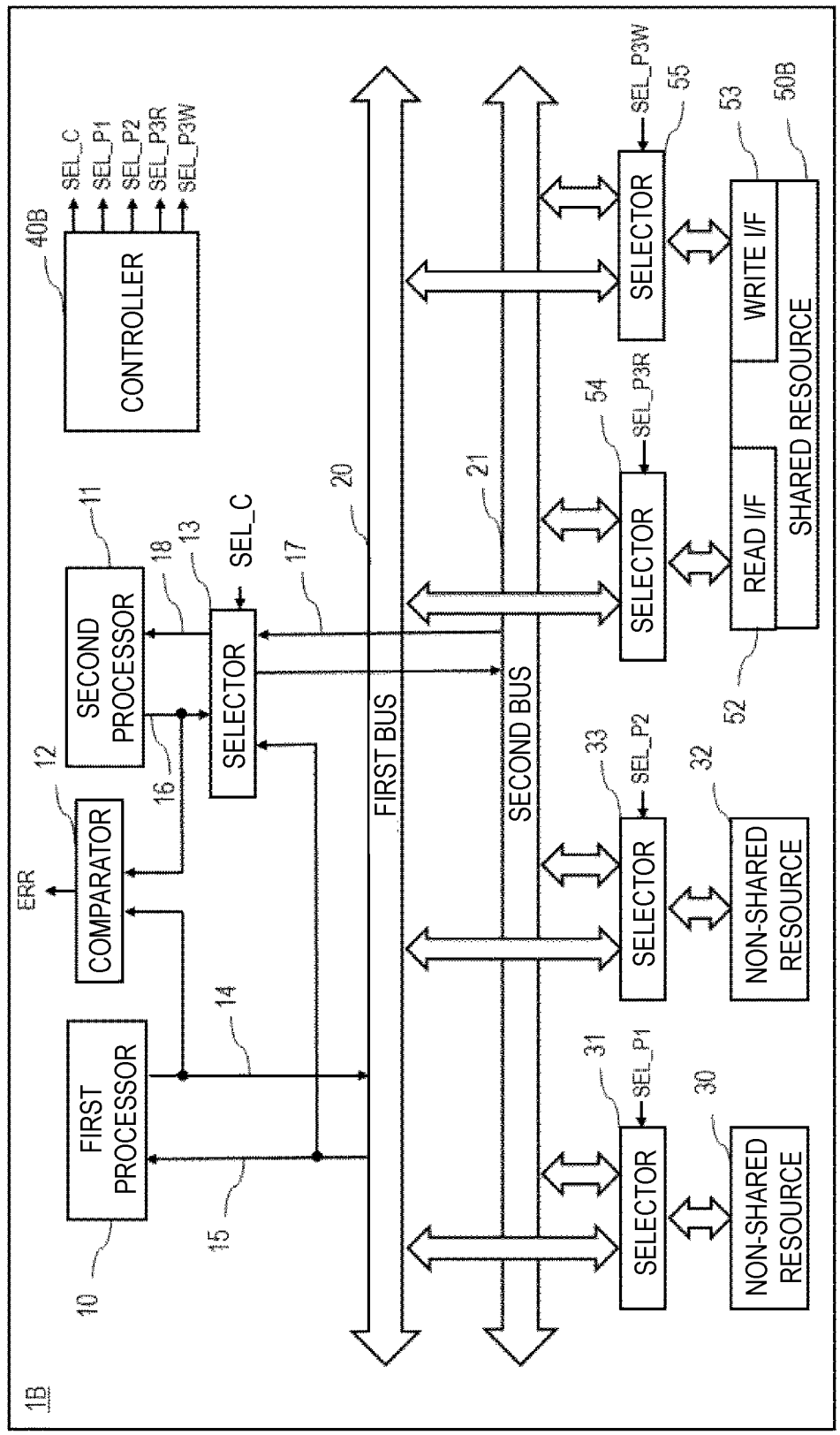
FIG. 7 is a block diagram illustrating a configuration of a modified example of the semiconductor device according to the second embodiment.

FIG. 7 is a block diagram illustrating a configuration of a modified example of the semiconductor device according to the second embodiment. Compared with the semiconductor device 1A according to the second embodiment, the semiconductor device 1B according to the present modified example differs in that shared resources 50B comprise a read interface (hereinafter sometimes referred to as "read I/F") 52 and a write interface (hereinafter sometimes referred to as "write I/F") 53, and in that it comprises selectors 54 and 55 in place of the arbiter 51. The shared resource 50B is a circuit including peripheral functions such as a memory, a timer, an I/O interface circuit, an analog-to-digital conversion circuit, or a digital-to-analog conversion circuit. The shared resource 50B is coupled to the first bus 20 and the second bus 21 via the selector 54 and the selector 55, and can be accessed by the first processor 10 and the second processor 11.

The read I/F 52 is an interface used to read data from the shared resource 50B. The selector 54 selects whether the read I/F 52 is accessed through the first bus 20 or the second bus 21. The selector 54 receives the bus selection signal SEL_P3R output from the controller 40B, and selects one of the first bus 20 and the second bus 21. In the lockstep mode, SEL_P3R is set to a value at which the selector 54 selects the first bus 20. In lockstep mode, the read I/F 52 is accessed via the first bus 20. On the other hand, in the non-lockstep mode, SEL_P3R can be set to a value at which the selector 54 selects the first bus 20 and a value at which the selector 54 selects the second bus 21. In the non-lockstep mode, the read I/F 52 is accessed via the first bus 20 or the second bus, depending on the SEL_P3R values.

The write I/F 53 is used for writing data to the shared resources 50B. The selector 55 selects whether the write I/F 55 is accessed via the first bus 20 or via the second bus 21. The selector 55 receives the bus selection signal SEL_P3W output from the controller 40B, and selects one of the first bus 20 and the second bus 21. In the lockstep mode, SEL_P3W is set to a value at which the selector 55 selects the first bus 20. In the lockstep mode, the write I/F 53 is accessed via the first bus 20. On the other hand, in the non-lockstep mode, SEL_P3W can be set to a value at which the selector 55 selects the first bus 20 and a value at which the selector 55 selects the second bus 21. In the non-lockstep mode, the write I/F 53 is accessed via the first bus 20 or the second bus 21, depending on the SEL_P3W values.

In FIG. 7, the selector 54 and the selector 55 are provided for both the read I/F 52 and the write I/F 53, but the configuration of semiconductor device 1B is not limited to this. For example, the bus access arbitration function similar to that of the arbiter 51 of FIG. 6 may be implemented in at least one of the selectors 54 and 55. When the selectors 54 and 55 implement the bus access arbitration function similar to that of the arbiter, it is preferable to implement SEL_P3R and SEL_P3W as priority selection signals for setting which bus the access from is prioritized, similarly to SEL_P3 of FIG. 6.

The selectors 31 and 33 of FIGS. 6 and 7, the selectors 54 and 55 of FIG. 7, and the arbiter 51 of FIG. 6 may implement both the above-described selection function and arbitration function.

The generation circuit of SEL_P3R, SEL_P3W included in the controller 40B is the same as the generation circuit of SEL_P1, SEL_P2 in FIG. 2. In FIG. 2, bus selection signals SEL_P1 and SEL_P2 indicate binary values of 0 and 1. When both the selection function and the arbitration function are implemented as described above, the bus selection signals SEL_P1 and SEL_P2 can be realized by increasing the number of setting registers so as to take three or more values so that the implemented function can be selected.

The operation of the semiconductor device 1B according to the present modified example will be described. When semiconductor device 1B operates in the lockstep mode, first processor 10 accesses non-shared resource 30, non-shared resource 32, and shared resource 50B via the first bus 20.

When semiconductor device 1B operates in the lockstep mode, the second processor 11 does not access any of the non-shared resource 30, the non-shared resource 32, or the shared resource 50B via the second bus 21, but only receives the interface signals 15 via the first bus. On the other hand, when semiconductor device 1B operates in the non-lockstep mode, for example, under the setting of SEL_P1=0, SEL_P2=1, SEL_P3R=0, and SEL_P3W=1, the first processor accesses the non-shared resource 30 and the read I/F 52 of the shared resource 50B via the first bus 20. When semiconductor device 1B operates in the non-lockstep mode, for example, under the setting of SEL_P1=0, SEL_P2=1, SEL_P3R=0, and SEL_P3W=1, the second processor 11 accesses the non-shared resource 32 and the write I/F 53 of the shared resource 50B via the second bus 21. As described above, under the setting of SEL_P3R=0 and SEL_P3W=1, the selector 54 and the selector 55 select different buses among the first bus 20 and the second bus 21.

In the semiconductor device 1B according to the present modified example, the shared resource 50B includes a read I/F 52 and a write I/F 53. The semiconductor device 1B further includes a selector 54 for selecting a bus to be used for accessing the read I/F 52, and a selector 55 for selecting a bus to be used for accessing the write I/F 53. The bus used for accessing the read I/F 52 is one of the first bus 20 and the second bus 21 according to the selection by the selector 54. Similarly, the bus used for accessing the write I/F 53 is one of the first bus 20 or the second bus 21 according to the selection by the selector 55. The selector 54 and the selector 55 may be configured to select different buses among the first bus 20 and the second bus 21. Therefore, it is possible to suppress the deterioration of the processing performance of semiconductor device 1B due to the conflict between the write access and the read access to the shared resources 50B.

Like the first embodiment, the buses used by the non-shared resources 30 and 32 can be selected by the selectors 31 and 33. Thus, for example, the non-shared resource 30 can be made accessible via the first bus 20. In addition, the non-shared resource 32 can be made accessible via the second bus 21. Since the bus access to the non-shared resource 30 and the bus access to the non-shared resource 32 are separated from each other, the access from the first processor 10 to the non-shared resource 30 and the access from the second processor 11 to the non-shared resource 32 do not conflict with each other. Therefore, it is possible to suppress the deterioration of the performance of the semiconductor device 1B due to the conflicting accesses to the non-shared resources 30 and 32.

Third Embodiment

Figure 8:
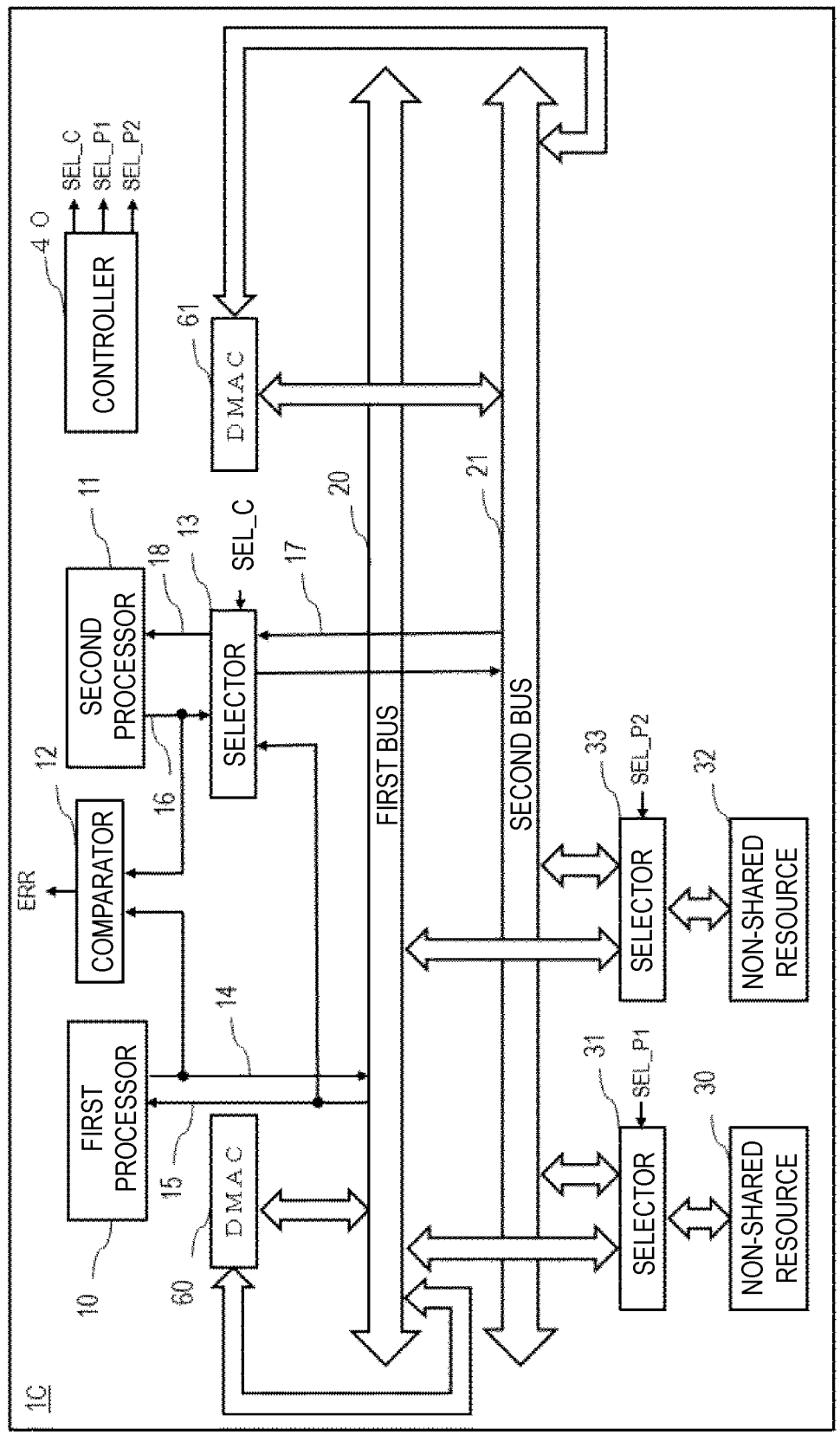
FIG. 8 is a block diagram illustrating an exemplary configuration of a semiconductor device according to a third embodiment.

FIG. 8 is a block diagram illustrating an exemplary configuration of the semiconductor device according to the third embodiment. The semiconductor device 1C according to the third embodiment differs from the semiconductor device 1 according to the first embodiment in that it further comprises DMAC, i.e., Direct Memory Access Controller, 60 and 61. Other configurations and operations are the same as those of semiconductor device 1 described in first embodiment, and therefore, the same reference numerals are assigned to the same configurations, and duplicate descriptions are omitted.

DMAC 60 is a first bus master, and has a function of reading data specified by a transfer source address and writing the read data to a transfer destination address, based on an operation instruction set by the first processor 10 via the first bus 20. DMAC 60 communicates with the non-shared resource 30 or the non-shared resource 32 via the first buses 20.

DMAC 61 is a second bus master, and has a function of reading data specified by a transfer source address and writing the read data to a transfer destination address, based on an operation instruction set by the second processor 11 via the second bus 21. DMAC 61 communicates with the non-shared resource 30 or the non-shared resource 32 via the second buses 21.

In the lockstep mode, DMAC 60 accesses the non-shared resources 30 and 32 via the first buses 20, based on the setting by the first processor 10. In the non-lockstep mode, DMAC 60 accesses the non-shared resource 30 or the non-shared resource 32 via the first bus 20, based on the DMA transfer settings set by the first processor 10 via the first bus 20. DMAC 61 accesses the non-shared resource 30 or the non-shared resource 32 via the second bus 21, based on the DMA transfer setting set by the second processor 11 via the second bus 21. The non-shared resources accessible to DMAC 60 and DMAC 61 are determined by the values of registers 42 and 43. For example, if the values of the bus selection signals are SEL_P1=0 and SEL_P2=1, in the non-lockstep mode, DMAC 60 accesses the non-shared resources 30 via the first bus 20. DMAC 61 accesses the non-shared resources 32 via the second bus 21.

According to the third embodiment, the semiconductor device 1C includes a DMAC 60 and a DMAC 61. Therefore, in addition to the processor, DMAC 60 and DMAC 61 access paths can be separated into the first bus and the second bus for DMA transfers processed by DMAC including the bus master function. Therefore, in the non-lockstep mode, the DMA transfer on the first bus 20 by DMAC 60 following the setting instruction of the DMA transfer from the first processor 10 to DMAC 60 does not conflict with the DMA transfer on the second bus 21 by DMAC 61 following the setting instruction of the DMA transfer from the second processor 11 to DMAC 61. Therefore, even when semiconductor device includes other bus masters in addition to the processor, it is possible to suppress performance deterioration caused by access conflict on the bus.

In FIG. 8, DMAC 60 and the bus master 61 are exemplified, but the configuration of semiconductor device 1C is not limited to this. DMAC 60, 61 may be any peripheral functional circuits including other bus master functions.

In the configuration of FIG. 8, DMAC 60 and the first processor 10 share the first bus 20 as a bus master. DMAC 61 and the second processor 11 share the second bus 21 as a bus master. Unlike the configuration shown in FIG. 8, a third bus (not shown) may be further added for DMAC 60 or DMAC 61, and communication with non-shared resources or the like may be performed via the bus. In this case, it is preferable that the selectors 31 and 33 are extended so that the third bus can also be selected. However, the selectors 31 and 33 are not necessarily configured to be capable of coupling to all the buses.

Further, the semiconductor device 1C may include a plurality of peripheral functions including a bus master function coupled to the first bus as required. Similarly, the semiconductor device 1C may include a plurality of peripheral functions including a bus master function coupled to the second bus. The semiconductor device 1C may be configured not to include either DMAC 60 or 61.

Fourth Embodiment

Figure 9:
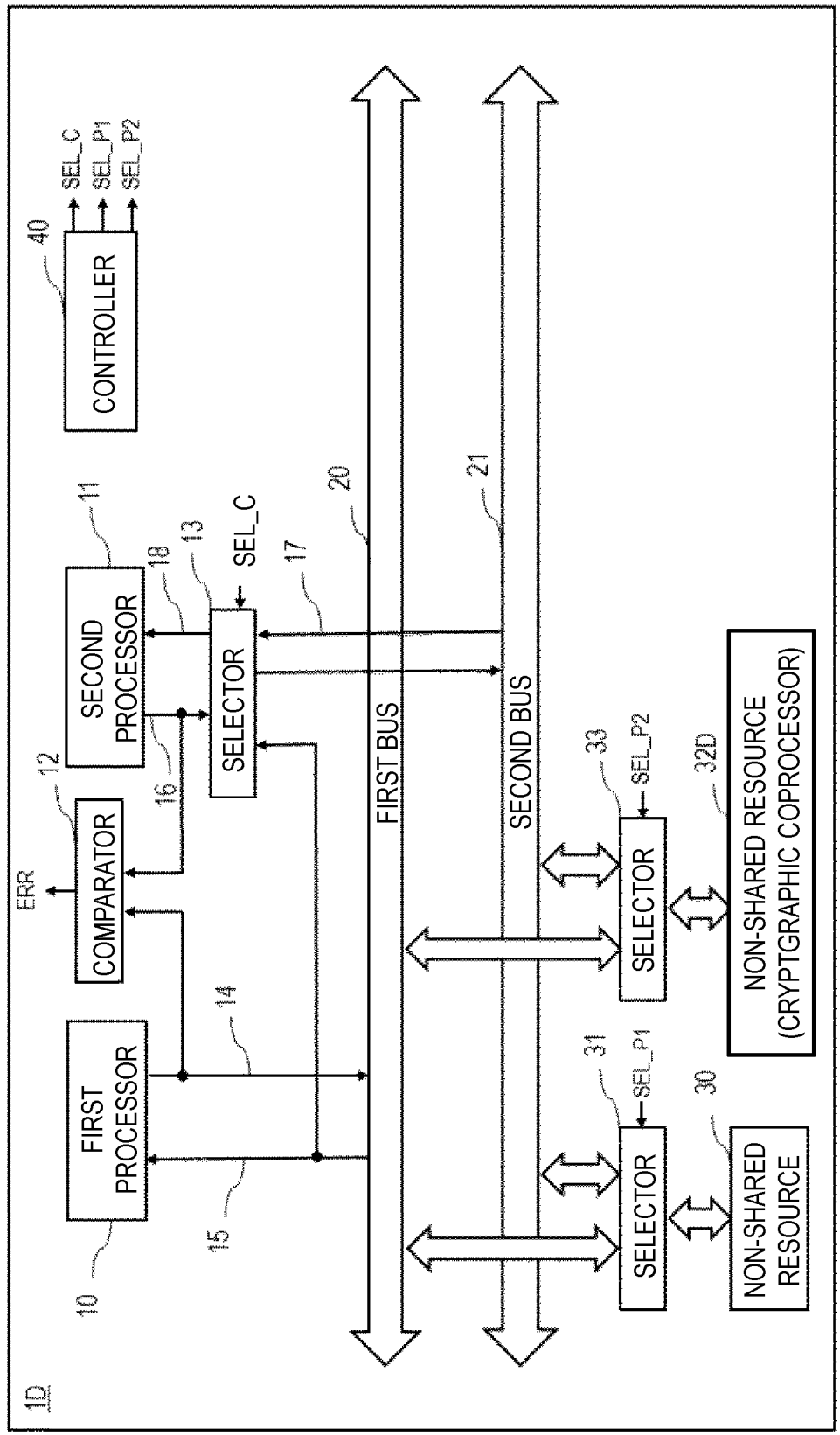
FIG. 9 is a block diagram illustrating an exemplary configuration of a semiconductor device according to a fourth embodiment.

FIG. 9 is a block diagram illustrating an exemplary configuration of the semiconductor device according to the fourth embodiment. The semiconductor device 1D according to the fourth embodiment differs in that non-shared resources 32 have been replaced by non-shared resources 32D compared to the semiconductor device 1 according to the first embodiment. Other configurations and operations are the same as those of semiconductor device 1 described in first embodiment, and therefore, the same reference numerals are assigned to the same configurations, and duplicate descriptions are omitted.

In semiconductor device 1D, the non-shared resources 32D includes a cryptographic coprocessor. The cryptographic coprocessor is an auxiliary processor that performs processing related to cryptographic processing. If semiconductor device 1 D operates in the non-lockstep mode, for example, the second processor dedicates the cryptographic coprocessor 32D.

According to the fourth embodiment, the semiconductor device 1D includes a first bus 20, a second bus 21, a selector 13, selectors 31 and 33, and a cryptographic coprocessor 32D which is a non-shared resource. For this reason, semiconductor device 1D may have a configuration in which, for example, the first bus 20 to which the first processor 10 is coupled and the second bus 21 to which the second processor 11 and the cryptographic coprocessor 32D are coupled are separated from each other. In application programs in the security field, separation from other application programs and security of QoS are often required. Since the access path to the cryptographic coprocessor 32D, which is a non-shared resource, can be separated from the access path used by the first processor in the non-lockstep mode, the semiconductor device 1D according to the present embodiment is suitable for realizing an application in the security field.

Although the invention made by the present invention has been specifically described based on the embodiments described above, the present invention is not limited to the embodiments already described, and various modifications can be made without departing from the gist thereof. For example, an extension on the bus slave in the second embodiment can be combined with an extension on the bus master in the third embodiment. DMACs 60 and 61 according to the third embodiment may be coupled to the first bus 20 and the second bus 21 via a selector or an arbiter, respectively.

What is claimed is:

1. A semiconductor device comprising:
   a first processor;
   a second processor that monitors operation of the first processor in a first mode;
   first and second non-shared resources dedicated to either the first processor or the second processor,
   a first bus with which the first processor, the second processor, the first non-shared resource and the second non-shared resource are coupled;
   a second bus with which the second processor, the first non-shared resource and the second non-shared resource are coupled;
   a first selector;
   a second selector; and
   a third selector,
   wherein the first selector selects either the first bus or the second bus, and a group of interface signal is transferred between the second processor and a bus selected by the first selector,
   wherein the second selector selects either the first bus or the second bus, and the first non-shared resource is accessed from the first processor and the second processor via a bus selected by the second selector,
   wherein the third selector selects either the first bus or the second bus, and the second non-shared resource is accessed from the first processor or the second processor via a bus selected by the third selector,
   wherein the first selector selects the first bus, and transfer a first group of interface signal included in the group of interface signal to the second processor in the first mode where the first processor and the second processor perform a same instruction stream,
   wherein the first selector selects the second bus, and the second selector selects the first bus, and the third selector selects the second bus, and transfer a second group of interface signal included in the group of interface signal to the second processor in the second mode where the first processor and the second processor perform a different instruction stream.

2. The semiconductor device according to claim 1, wherein in the second mode, the first processor accesses the first non-shared resource via the first bus, and the second processor accesses the second non-shared resource via the second bus.

3. The Semiconductor device according to claim 1, further comprising:
   a comparator,
   wherein the second processor outputs a third group of interface signal included in the group of interface signals to the first selector,
   wherein the first processor outputs a fourth group of interface signal not included in the group of interface signal to the first bus, and
   wherein the comparator activates an error signal when the third group of interface signal and the fourth group of interface signal differ from each other.

4. The semiconductor device according to claim 3, wherein the first selector prevents the third group of interface signal from being transmitted to the first bus in the first mode, and transfers the third group of interface signal to the second bus in the second mode.

5. The semiconductor device according to claim 1, wherein, in the second mode, the second selector detects access from the second processor to the first non-shared resource as illegal access, and the third selector detects access from the first processor to the second non-shared resource as illegal access.

6. The semiconductor device according to claim 1, wherein, in the second mode, a selection of the first bus or the second bus by each of the second selector and the third selector, is variable.

7. The semiconductor device according to claim 1, further comprising a shared resource commonly utilized by the first and second processors,
   wherein, in the second mode, the first processor accesses the shared resource via the first bus, and the second processor accesses the shared resource via the second bus.

8. The semiconductor device according to claim 1, further comprising:
   a shared resource commonly utilized by the first processor and the second processor;
   a fourth selector; and
   a fifth selector,
   wherein the shared resource comprises:
      a read interface; and
      a write interface,
   wherein the fourth selector selects either the first bus or the second bus, and the shared resource is accessed from the first processor or the second processor via a bus selected by the fourth selector, wherein the fifth selector selects either the first bus or the second bus, and the shared resource is accessed from the first processor or the second processor via a bus selected by the fifth selector.

9. The semiconductor device according to claim 8, wherein, in the second mode, the fourth selector and the fifth selector select a different bus from the first bus and the second bus.

10. The semiconductor device according to claim 9, wherein, in the second mode, the second processor includes a write access to the shared resource via the second bus when the first processor includes a read access to the shared resource via the first bus, and wherein, in the second mode, the second processor includes a read access to the shared resource via the second bus when the first processor has a write access to the shared resource via the first bus.

11. The semiconductor device according to claim 1, further comprising:

a first bus master; and a second bus master, wherein the first bus master is coupled to the first bus, and the second bus master is coupled to the second bus.

12. The semiconductor device according to claim 1, wherein the second non-shared resource comprises a cryptographic coprocessor that perform cryptographic processing.

13. A method of operating a semiconductor device including first and second processors, first and second non-shared resources, first and second buses, and first to third selectors, in which the first processor is coupled with the first bus, the method comprising:

setting either a first or a second mode of operation;

executing a same instruction stream in the first mode of operation by the first and second processors; and executing a different instruction stream in the second mode of operation by the first and second processors, wherein the executing a same instruction stream comprises:

selecting the first bus by the first selector and coupling the second processor with the first bus;

selecting the first bus by the second selector and coupling the first non-shared resource with the first bus;

selecting the first bus by the third selector and coupling the first bus with the second non-shared resource;

accessing the first non-shared resource and the second non-shared resource by the first processor via the first bus and the second selector;

transferring a group of interface signal through the first bus to the second processor via the second selector; and comparing outputs of the first and second processors, and wherein the executing a different instruction stream comprises:

selecting the second bus by the first selector and coupling the second processor with the second bus;

selecting the first bus by the second selector and coupling the first non-shared resource with the first bus;

selecting the second bus by the third selector, and coupling the second bus with the second non-shared resource;

accessing the first non-shared resource by the first processor via the first bus and the second selector; and accessing the second non-shared resource by the second processor via the second bus and the third selector.

14. The method of operating the semiconductor device according to claim 13, wherein the executing a different instruction stream further comprises determining an access to the second non-shared resource by the first processor and an access to the first non-shared resource by the second processor as an illegal access.

15. The method of operating the semiconductor device according to claim 13, the semiconductor device further comprises a shared resource, wherein the executing a different instruction stream further comprises:

accessing the shared resource by the first processor via the first bus; and accessing the shared resource by the second processor via the first selector and the second bus.

16. The method of operating the semiconductor device according to claim 13, the semiconductor device further comprises a first and second bus masters, wherein the executing a different instruction stream further comprises:

coupling the first bus master to the first bus; and coupling the second bus master to the second bus.

17. The method of operating the semiconductor device according to claim 13, wherein the executing a different instruction stream further comprises executing cryptographic processing with the second non-shared resource.

18. A semiconductor device comprising:

a first processor;

a second processor that monitors operation of the first processor in a first mode;

a shared resource commonly utilized by the first and second processor;

a non-shared resource dedicated to the second processor in a second mode, a first bus with which the first processor, the second processor, the shared resource, the non-shared resource are coupled;

a second bus with which the second processor, the shared resource, the non-shared resource are coupled;

a first selector; and a second selector, wherein the first selector selects either the first bus or the second bus, and a group of interface signal is transferred between the second processor and a bus selected by the first selector, wherein the second selector selects either the first bus or the second bus, and the non-shared resource is accessed from the first processor and the second processor via a bus selected by the second selector, wherein the first selector selects the first bus, and transfer a first group of interface signal included in the group of interface signal to the second processor in the first mode where the first processor and the second processor perform a same instruction stream, wherein the first selector selects the second bus, and the second selector selects the second bus, and transfer a second group of interface signal included in the group of interface signal to the second processor in the second mode where the first processor and the second processor perform a different instruction stream.

* * * * *